United States Patent

[11] 3,623,104

[72] Inventors Michel Jacques Robert Nicolas Paris; Jacques Desire Deschamps, Saint-Cloud; Andre Adamsbaum, Boulogne-Billancourt, all of France

[21] Appl. No. 163,970
[22] Filed Dec. 28, 1961
[45] Patented Nov. 23, 1971
[73] Assignee Societe Nationale D'Etude et de Construction de Moteurs D'Aviation Paris-Seine, France
[32] Priority Dec. 30, 1960
[33] France
[31] 848524

[54] MATCHED FILTERS FOR THE TREATMENT OF FREQUENCY-MODULATED PULSES
1 Claim, 2 Drawing Figs.

[52] U.S. Cl. .......... 343/17.2 R
[51] Int. Cl. .......... G01s 9/02
[50] Field of Search .......... 343/17.1, 17.2, 100, 100.7; 179/15.5, 15.6, 15.7

[56] References Cited
UNITED STATES PATENTS
2,678,997 5/1954 Darlington .......... 343/17.2

*Primary Examiner*—Malcolm F. Hubler
*Attorney*—Watson, Cole, Grindle & Watson

CLAIM: 1. A long-range radar system comprising in combination a short pulse generator, a transmission set with an antenna, a reception set with an antenna, matched filter circuitry comprising a single delay line for transforming short pulses of high peak power into long pulses of low peak power and vice versa with a single input terminal at one end connected to both said generator to receive pulses therefrom and to said reception set to receive signals therefrom, the delay line having a center of symmetry with a plurality of spaced taps along said delay line symmetrically located two by two about said center of symmetry, a summation stage having an input line for each of said taps and an output connected to said transmission set for supplying a signal proportional to the algebraic sum of all voltages supplied to the input lines, and separate amplifiers connecting each tap with each input line with respective gains for the symmetric pairs of taps being equal.

MATCHED FILTERS FOR THE TREATMENT OF FREQUENCY-MODULATED PULSES

The present invention has for its object a form of electronic circuitry adapted to transform short pulses of high peak power into long pulses of low peak power, and vice versa. A transformation of this type can be extremely useful in pulse-type telecommunications systems or for long-range radars, in which it is of advantage to use a reduced transmission peak power, owing to the inherent limitations of the equipment used, in conjunction with an increased reception peak power in order to improve the signal/noise ratio and the quality of pulse identification.

Recourse has already been had, in order to achieve this transformation, to scattering filters, i.e. to filters the propagation times of which vary in terms of the frequency. In such systems, a first filter used for transmission lengthens an initially short pulse, as described in "An Introduction to Matched Filters" by G. L. Turin, I.R.E. Transactions on Information Theory, June 1960, pp. 311–329 while a second filter, which is complementary to the first is used for reception, shortens the duration of the lengthened pulse. The requisite for two such filters to be complementary to each other is that the sum of their propagation times be independent of the frequency.

The present invention relates to an improvement in pulse transformation circuitry of this type, in accordance with which the scattering filter and its complementary filter are assimilated into one and the same filter.

The essential particularity of such a filter according the the invention is that a short-duration incoming pulse is transformed into a long-duration outgoing pulse that is frequency-modulated symmetrically through time, i.e. the instantaneous frequency is identical at any two instants $t_1$ and $t_2$ that are symmetrically located with respect to an instant $t_0$ representing the center of the pulse (See FIG. 1). As hereinbefore stated, the propogation time varies with frequency so that the equally spaced positions $t_1$ and $t_2$ on either side of $t_0$ will provide similar frequency components at any instant and other equally spaced positions will provide different components.

Steps may also be taken, though this is no means indispensable, so that the instantaneous amplitude of the outgoing long pulse shall likewise be symmetrical with respect to $t_0$. When this is so, the signal itself will have $t_0$as its center of symmetry.

It may consequently be claimed of such a filter that each frequency corresponds to two propogation times the mean time of which is independent of the frequency.

In one embodiment, the pulse transformation circuitry according to the present invention comprises a delay line having regularly spaced taps to which are connected branch lines having specific individual gain characteristics, the gains corresponding to any two branch lines connected to taps located symmetrically with respect to the center of the line being equal, and said branch lines leading into a summation stage which furnishes an output signal proportional to the algebraic sum of the voltages tapped from the delay line, with due account for the respective gains involved. One end of said delay line constitutes the input to the combined filter.

The description which follows with reference to the accompanying drawing, filed by way of example and not of limitation, will give a clear understanding of how the invention may be performed, such particularities as emerge either from the description or the drawing naturally falling within the scope of the invention.

Referring to the drawing filed herewith:

Figure 1:
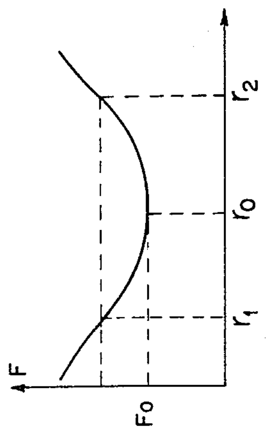
FIG. 1 is the explanatory diagram to which reference has been made hereinabove.
Figure 2:
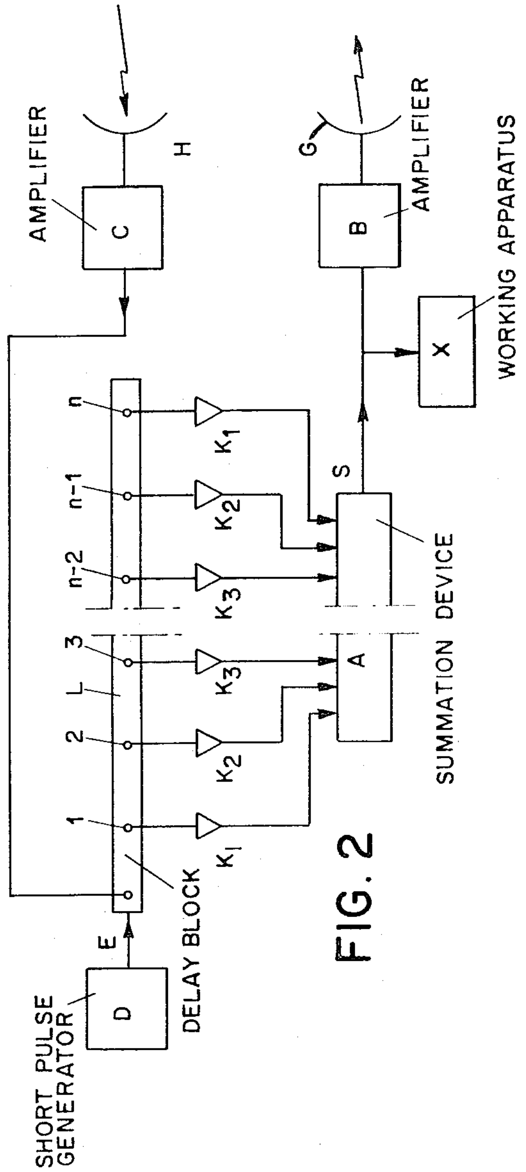
FIG. 2 is a block diagram showing a circuitry executed according to the invention for application to a radar system.

In the embodiment illustrated, use is made of a delay line L along which are disposed regularly spaced taps 1, 2, 3 .....*n*- from which the signal may be collected. From each tap is led a branch line comprising an amplifier the positive or negative gain K of which may be adjusted to any convenient value.

In accordance with the present invention, the gains K1, K2, K3 .....of the amplifiers corresponding to pairs of taps 1 and *n*, 2 and *n*–1, 3 and *n*–2, ..., located symmetrically with respect to the center of the line, are equal. Their actual values will depend upon the law whereby it is desired to govern the frequency modulation of the long pulse, and these values may be adjusted to take the line attenuation into account.

The branch lines connected to the delay line L are led into a summation stage A providing at its output S a voltage that is proportional to the algebraic sum of the voltage tapped at 1, 2, 3 ...*n*, after application thereto of gains K1, K2, K3... K1, respectively.

A filter executed thus has a single input E at one end of line L.

If a short-duration pulse from a suitable generator D be applied to the input E, the long-duration pulse appearing at the output S will be symmetrically time centered.

In a radar installation, the long-duration pulse is processed in amplification (and, if required, frequency translation) stages B before being fed to the transmitting antenna G.

The pulse received on the receiving antenna H is similarly processed in amplification (and, if required, frequency translation) stages C and applied to the filter input E, whereby a short-duration pulse is obtained at the output S.

The signals obtained are then put to use in a stationary apparatus x of any type well known per se.

It is to be clearly understood that, without departing from he scope of the present invention, many modifications may be made to the specific embodiment hereinbefore described, in particular by having recourse to other technical means fully accessible to the specialist in the art.

What is claimed is:

1. A long-range radar system comprising in combination a short pulse generator, a transmission set with an antenna, a reception set with an antenna, matched filter circuitry comprising a single delay line for transforming short pulses of high peak power into long pulses of low peak power and vice versa with a single input terminal at one end connected to both said generator to receive pulses therefrom and to said reception set to receive signals therefrom, the delay line having a center of symmetry with a plurality of spaced taps along said delay line symmetrically located two by two about said center of symmetry, a summation stage having an input line for each of said taps and an output connected to said transmission set for supplying a signal proportional to the algebraic sum of all voltages supplied to the input lines, and separate amplifiers connecting each tap with each input line with respective gains for the symmetric pairs of taps being equal.

* * * * *